(12) United States Patent
Schoenlieb et al.

(10) Patent No.: US 11,686,828 B2
(45) Date of Patent: Jun. 27, 2023

(54) METHOD AND APPARATUS FOR COMPENSATING STRAY LIGHT CAUSED BY AN OBJECT IN A SCENE THAT IS SENSED BY A TIME-OF-FLIGHT CAMERA

(71) Applicant: Infineon Technologies AG, Neubiberg (DE)

(72) Inventors: Armin Schoenlieb, Seiersberg-Pirka (AT); David Lugitsch, Graz (AT); Hannes Plank, Graz (AT)

(73) Assignee: Infineon Technologies AG, Neubiberg (DE)

( * ) Notice: Subject to any disclaimer, the term of this patent is extended or adjusted under 35 U.S.C. 154(b) by 367 days.

(21) Appl. No.: 16/892,655

(22) Filed: Jun. 4, 2020

(65) Prior Publication Data
US 2020/0386874 A1    Dec. 10, 2020

(30) Foreign Application Priority Data
Jun. 6, 2019 (EP) .................... 19178782

(51) Int. Cl.
*G01S 7/493* (2006.01)
*G01S 17/894* (2020.01)
*G01S 7/48* (2006.01)
*H04N 23/72* (2023.01)

(52) U.S. Cl.
CPC ............ *G01S 7/493* (2013.01); *G01S 7/4802* (2013.01); *G01S 17/894* (2020.01); *H04N 23/72* (2023.01)

(58) Field of Classification Search
CPC ...... G01S 7/493; G01S 17/894; G01S 7/4802; H04N 5/2352
See application file for complete search history.

(56) References Cited

U.S. PATENT DOCUMENTS

| 6,714,286 B1 | 3/2004 | Wheel |
| 2011/0149071 A1* | 6/2011 | Oggier .................... G01S 17/86 348/140 |

FOREIGN PATENT DOCUMENTS

| EP | 3015881 A2 | 5/2016 |
| WO | 2015075413 A1 | 5/2015 |

* cited by examiner

*Primary Examiner* — Twyler L Haskins
*Assistant Examiner* — Fayez A Bhuiyan
(74) *Attorney, Agent, or Firm* — Murphy, Bilak & Homiller, PLLC

(57) ABSTRACT

A method for compensating stray light caused by an object in a scene that is sensed by a time-of-flight camera is provided. The method includes receiving an image of the scene from the time-of-flight camera. Further, the method includes controlling the time-of-flight camera to capture a reference image of the scene using a code modulated signal for illumination such that a measurement range of the time-of-flight camera is limited to a distance range around the object. The method additionally includes modifying the image of the scene or an image derived therefrom using the reference image to obtain a compensated image of the scene. The method includes outputting the compensated image.

20 Claims, 5 Drawing Sheets

800

METHOD AND APPARATUS FOR COMPENSATING STRAY LIGHT CAUSED BY AN OBJECT IN A SCENE THAT IS SENSED BY A TIME-OF-FLIGHT CAMERA

TECHNICAL FIELD

The present disclosure relates to error correction for Time-of-Flight (ToF) sensing. In particular, examples relate to a method and an apparatus for compensating stray light caused by an object in a scene that is sensed by a ToF camera.

BACKGROUND

Highly reflective objects such as, e.g., street signs cause erroneous depth measurements by ToF cameras. The reflections from a highly reflective object cause erroneous measurements due to unwanted light mixes of stray light from the highly reflective object with light reflected by other objects in a scene sensed by the ToF camera.

SUMMARY

Hence, there may be a demand for compensating stray light from objects in a scene.

An example relates to a method for compensating stray light caused by an object in a scene that is sensed by a ToF camera. The method comprises receiving an image of the scene from the ToF camera. Further, the method comprises controlling the ToF camera to capture a reference image of the scene using a code modulated signal for illumination such that a measurement range of the ToF camera is limited to a distance range around the object. The method additionally comprises modifying the image of the scene or an image derived therefrom using the reference image to obtain a compensated image of the scene. The method comprises outputting the compensated image.

Another example relates to an apparatus for compensating stray light caused by an object in a scene that is sensed by a ToF camera. The apparatus comprises an input circuit configured to receive an image of the scene from the ToF camera. Further, the apparatus comprises a processing circuit configured to control the ToF camera to capture a reference image of the scene using a code modulated signal for illumination such that a measurement range of the ToF camera is limited to a range around the object. The processing circuit is additionally configured to modify the image of the scene or an image derived therefrom using the reference image to obtain a compensated image of the scene. The apparatus comprises an output circuit configured to output the compensated image.

Those skilled in the art will recognize additional features and advantages upon reading the following detailed description, and upon viewing the accompanying drawings.

BRIEF DESCRIPTION OF THE FIGURES

Some examples of apparatuses and/or methods will be described in the following by way of example only; and with reference to the accompanying figures, in which.

DETAILED DESCRIPTION

Various examples will now be described more fully with reference to the accompanying drawings in which some examples are illustrated. In the figures, the thicknesses of lines, layers and/or regions may be exaggerated for clarity.

Accordingly, while further examples are capable of various modifications and alternative forms, some particular examples thereof are shown in the figures and will subsequently be described in detail. However, this detailed description does not limit further examples to the particular forms described. Further examples may cover all modifications, equivalents, and alternatives falling within the scope of the disclosure. Same or like numbers refer to like or similar elements throughout the description of the figures, which may be implemented identically or in modified form when compared to one another while providing for the same or a similar functionality.

It will be understood that when an element is referred to as being "connected" or "coupled" to another element, the elements may be directly connected or coupled or via one or more intervening elements. If two elements A and B are combined using an "or", this is to be understood to disclose all possible combinations, i.e. only A, only B as well as A and B, if not explicitly or implicitly defined otherwise. An alternative wording for the same combinations is "at least one of A and B" or "A and/or B". The same applies, mutatis mutandis, for combinations of more than two Elements.

The terminology used herein for the purpose of describing particular examples is not intended to be limiting for further examples. Whenever a singular form such as "a", "an" and "the" is used and using only a single element is neither explicitly nor implicitly defined as being mandatory, further examples may also use plural elements to implement the same functionality. Likewise, when a functionality is subsequently described as being implemented using multiple elements, further examples may implement the same functionality using a single element or processing entity. It will be further understood that the terms "comprises", "comprising", "includes" and/or "including", when used, specify the presence of the stated features, integers, steps, operations, processes, acts, elements and/or components, but do not preclude the presence or addition of one or more other features, integers, steps, operations, processes, acts, elements, components and/or any group thereof.

Unless otherwise defined, all terms (including technical and scientific terms) are used herein in their ordinary meaning of the art to which the examples belong.

Figure 1:
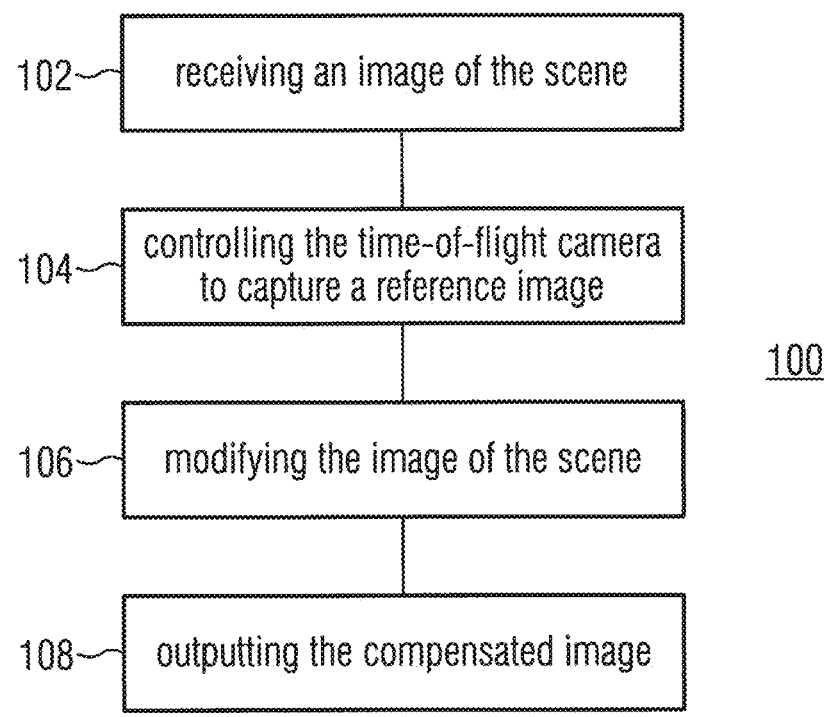
FIG. 1 illustrates a flowchart of an example of a method for compensating stray light caused by an object in a scene that is sensed by a ToF camera.

FIG. 1 illustrates a flowchart of a method 100 for compensating light reflections such as stray light from an object in a scene that is sensed by a ToF camera. Method 100 comprises receiving 102 an image of the scene from the ToF camera. The image of the scene may be any type of image that can be provided by a ToF camera such as a raw image or an image derived from the raw image. In some examples, the image of the scene may be an image that is based on one of the images listed above and error corrected for one or more errors of the ToF camera. The image of the scene may be an image that is based on a combination of one of the images listed above and another image (e.g. a combination of two raw or depth images captured using modulation signals of different frequency).

Figure 2:
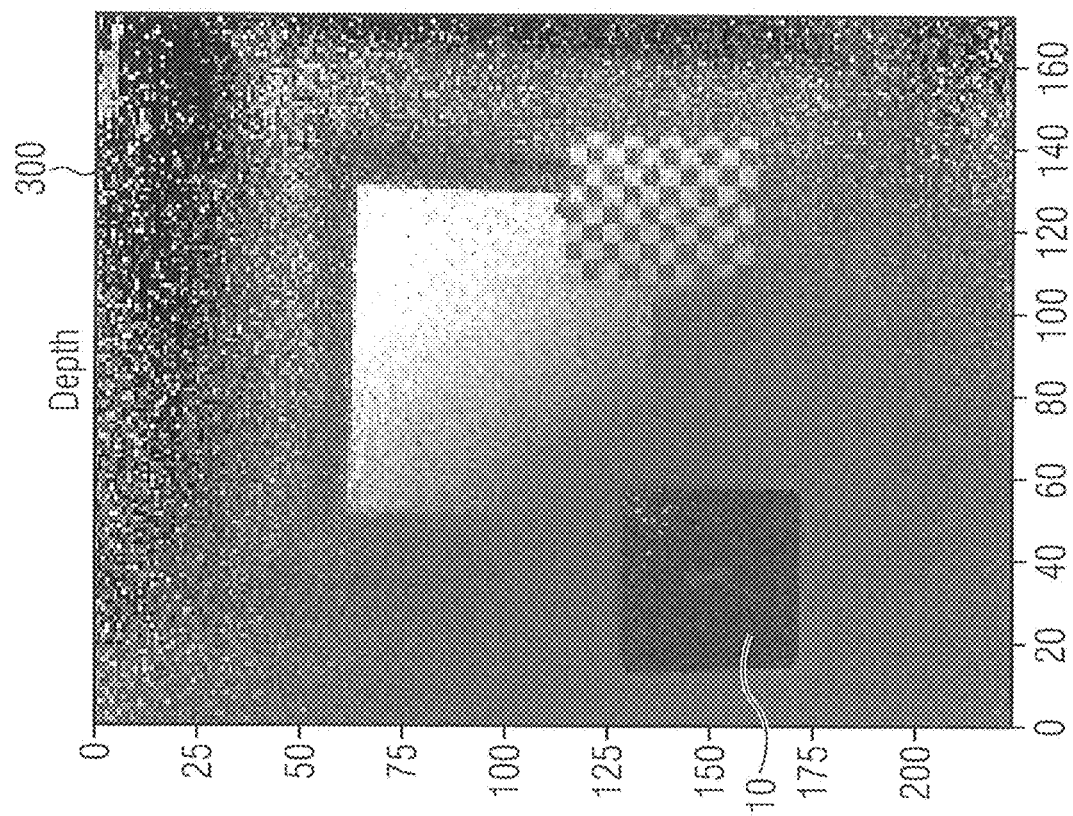
FIG. 2 illustrates an example of an intensity image of scene comprising a highly reflective object.
Figure 3:
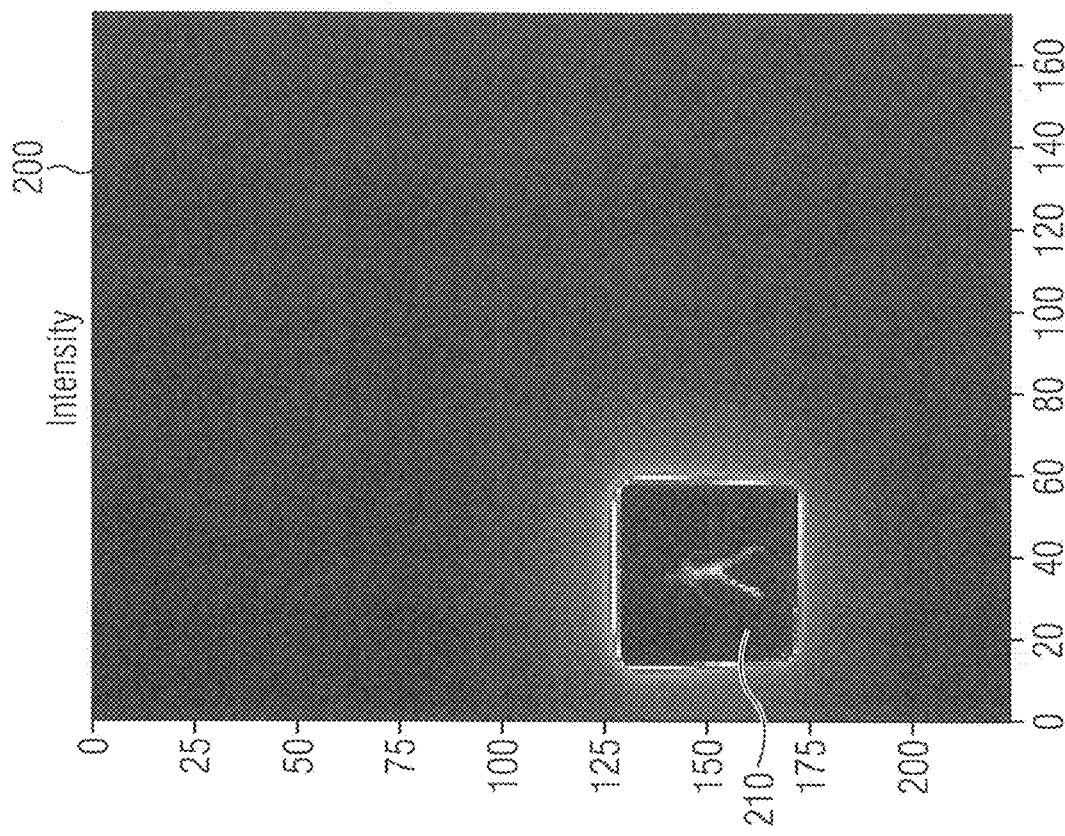
FIG. 3 illustrates an example of a depth image of scene comprising a highly reflective object.

Two exemplary images 200 and 300 of a scene sensed by a ToF camera are illustrated in FIGS. 2 and 3. FIG. 2 illustrates an intensity image 200 of a scene and FIG. 3 illustrates a corresponding depth image 300 of the scene. Prior to describing the remaining method 100 in detail, some basics of ToF depth measurement will introductorily be described in the following paragraphs for pedagogical reasons.

A ToF camera comprises an illumination element for illuminating the scene with modulated light (e.g. infrared light). The illumination element generates the modulated light based on a (electric) modulated radio frequency signal such as a continuous wave modulated signal (e.g. by controlling one or more Light-Emitting Diodes, LEDs, or one or more laser diodes based on the modulated signal). An object in the scene that is illuminated by the modulated light reflects at least part of the modulated light back to a light capturing element (e.g. comprising optics, an image sensor and driver electronics) of the ToF camera. In other words, the light capturing element receives reflected light from the object.

The image sensor of the light capturing element is pixelated and each pixel measures a fraction of the reflected light. Accordingly, (electric) measurement signals based on the reflected light from the scene are generated. For example, each pixel may comprise a Photonic Mixer Device (PMD) for measuring the reflected light.

Depending on the distance $d_{obj}$ between the ToF camera and the object, i.e. depending on the depth, the reflected light exhibits a delay with respect to the emission of the modulated light. Accordingly, the measurement signals experience distance dependent (depth dependent) phase shifts with respect to the modulated radio frequency signal.

The modulated signal and the measurement signal of the respective pixel are correlated according to a (auto)correlation function $c(\delta+\varphi_d)$ to obtain a correlation value L for each pixel. The correlation function $c(\delta+\varphi_d)$ mimics a phase-distance function describing the relation between the distance $d_{obj}$ and a phase value as measured by each pixel of the ToF camera.

The output of the correlation function $c(\delta+\varphi_d)$ is the correlation value L for each pixel. The determined correlation values L are then combined to a raw image (sometimes also referred to as "phase image"). That is, the raw image comprises a plurality of pixels each representing a corresponding correlation value L.

To sample the correlation function $c(\delta+\varphi_d)$, plural raw images are generated. A phase offset $\delta$ between the modulated signal and the measurement signals as used for the correlations varies between the individual raw images. In other words, different phase offsets $\delta$ are used for correlating the modulated signal and the measurement signals to obtain the individual raw images.

Sampling the same object at the same distance and exhibiting the same reflectivity enables to sample the correlation function $c(\delta+\varphi_d)$. For example, phase offsets of 0°, 90°, 180° and 270° may be used to generate four raw images each comprising a plurality of pixels that represent corresponding correlation values $L_{0°}$, $L_{90°}$, $L_{180°}$ and $L_{270°}$.

For the phase correlation value $L_{0°}$, the correlation function $c(\delta+\varphi_d)$ is shifted by the distance dependent phase shift $\varphi_d$ between the measurement signal and the modulated signal of the pixel with respect to the zero value of the function's argument.

Using the four correlation values $L_{0°}$, $L_{90°}$, $L_{180°}$ and $L_{270°}$ that sample the correlation function $c(\delta+\varphi_d)$, the phase shift (phase angle) $\varphi_d$ may be determined as follows:

$$\varphi_d = a\tan2\left(\frac{L_{90°} - L_{270°}}{L_{0°} - L_{180°}}\right) \quad (1)$$

Taking into account the speed of light c and the modulation frequency $f_p$ of the emitted light (i.e. the modulation frequency of the modulated signal), the distance $d_{obj}$ to the object, i.e. the depth, may be calculated as follows:

$$d_{obj} = \frac{c}{2} \cdot \frac{\varphi_d}{2\pi \cdot f_p} \quad (2)$$

In the scene captured in FIGS. 2 and 3, a highly reflective object taking in a non-limiting manner the form of a street sign 210 is arranged in front of a white wall. As can be seen from the intensity image 200 illustrated in FIG. 2, the intensity of the light reflections received by the ToF camera from the street sign 210 is very high due to the high reflectivity of the street sign 210. Further, it can be seen that the street sign is surrounded by a kind of corona with increased light intensity compared to the remaining parts of the intensity image 200. The corona is caused by (intense) stray light of the highly reflective street sign 210. In the depth image 300 illustrated in FIG. 3, the stray light of the highly reflective street sign 210 causes a corona of wrong depth measurement values around the street sign 210. In particular, the stray light of the highly reflective street sign 210 leads to wrong depth measurements for the white wall in the background in the vicinity of the street sign 210. While the influence of the stray light for the upper right corner of the white wall depicted in FIG. 3 is not very high, the influence of the stray light for the lower left corner of the white wall depicted in FIG. 3 is high. The reflections from the highly reflective street sign 210 cause erroneous measurements due to unwanted light mixes of stray light from the highly reflective street sign 210 with light reflected by the white wall.

Figure 4:
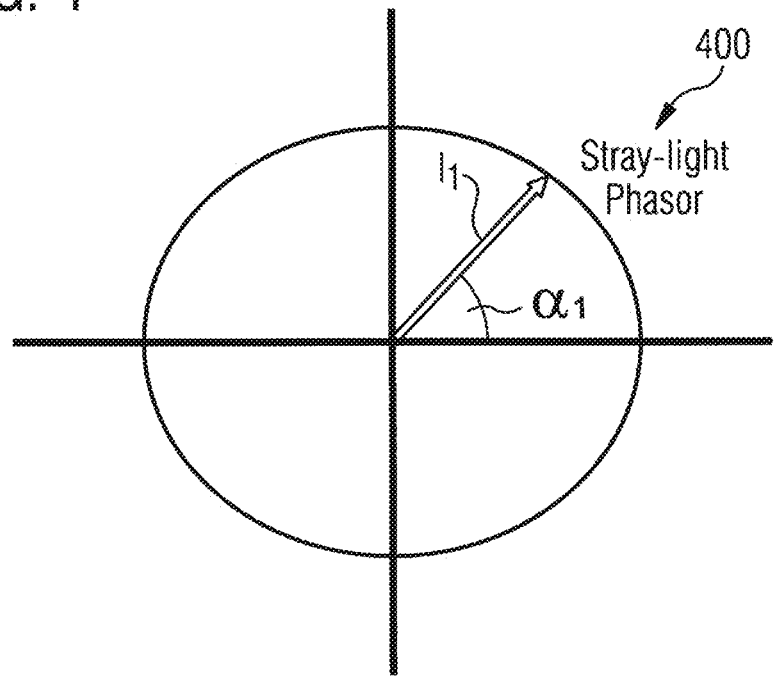
FIG. 4 illustrates an example of a phasor caused by stray light of a highly reflective object in a scene.
Figure 5:
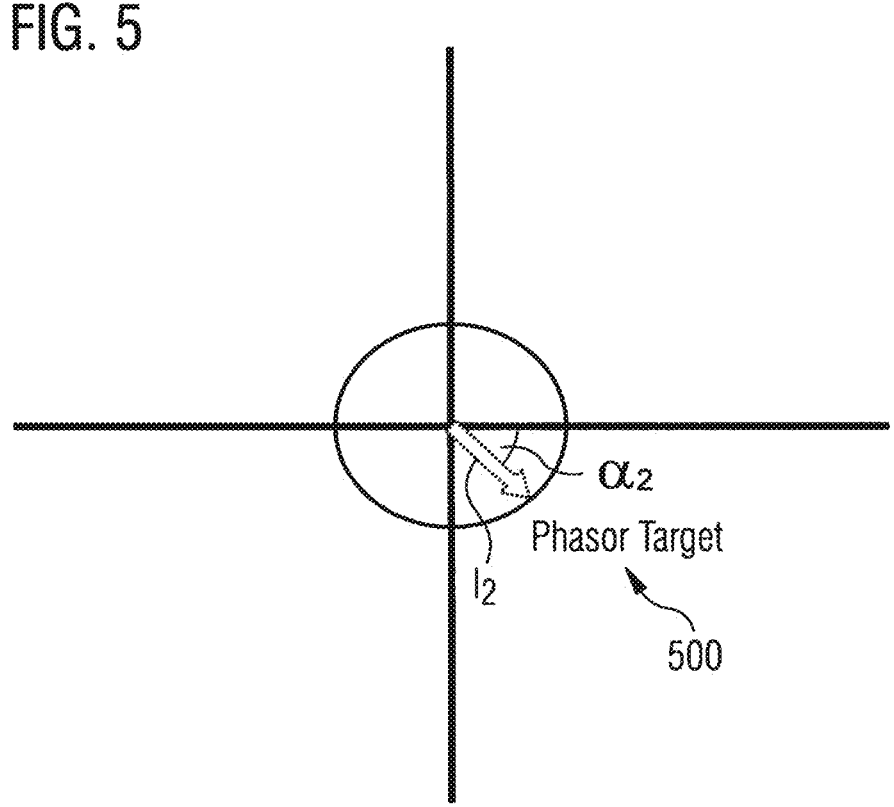
FIG. 5 illustrates an example of a phasor caused by light reflected by a target object in a scene.
Figure 6:
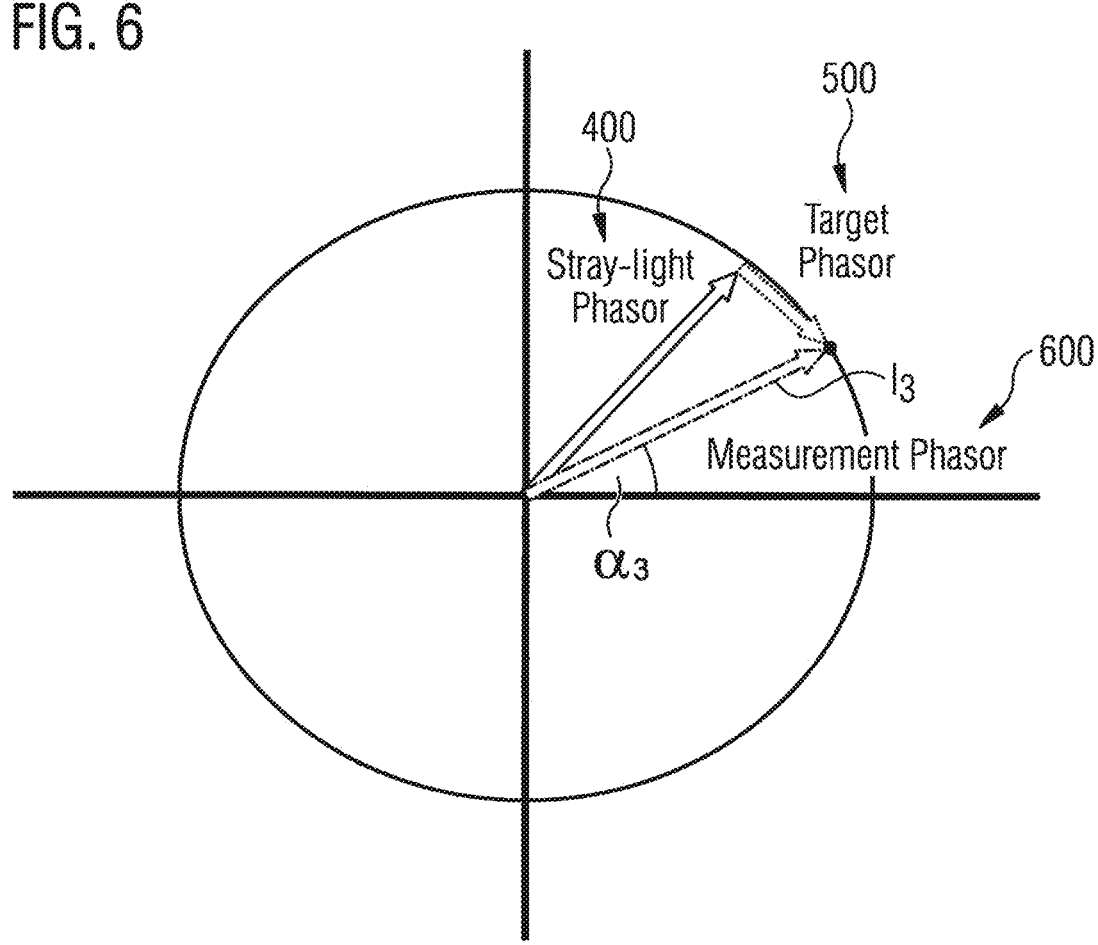
FIG. 6 illustrates an example of a phasor caused by a superposition of stray light of a highly reflective object and light reflected by a target object.

This will become more evident from the exemplary phasors illustrated in FIGS. 4 to 6. A phasor (also known as phase vector) is a complex number representing a ToF measurement. The phasor consists of an angle describing the (depth/distance dependent) phase shift of a measurement signal measured by the ToF camera's light capturing element based on the reflected light from the scene with respect to the modulated radio frequency signal used by the ToF camera's illumination element for illuminating the scene. Further, the phasor consists of a length describing the intensity of the measurement signal, i.e. the measured intensity of the reflected light from the scene. Since the angle of the phase is depth/distance dependent, sensing an object at different distances with respect to the ToF camera rotates the phasor.

A phasor image comprising pixels that represent the phasors for the individual pixels of the ToF camera's light capturing element may be derived from one or more raw images of the ToF camera. Hence, a phasor image may be an example of an image derived from a raw image of the ToF camera.

FIG. 4 illustrates a phasor 400 caused by the stray light of the highly reflective street sign 210 illustrated in FIGS. 2 and 3. The phasor 400 exhibits an intensity $I_1$ and an angle $\alpha_1$. The phasor 400 represents an error component for the ToF measurement of the area surrounding the highly reflective street sign 210 since it represents the stray light of the highly reflective street sign 210.

FIG. 5 illustrates a phasor 500 caused by only the white wall in the background of the highly reflective street sign 210. The phasor 500 exhibits an intensity $I_2$ and an angle $\alpha_2$. The phasor 500 represents a desired component for the ToF measurement since it represents the reflected light coming from the white wall without the influence of the stray light of the highly reflective street sign 210.

FIG. 6 illustrates a phasor 600 as measured by the ToF camera using the continuous wave signal for illumination. The phasor 600 exhibits an intensity $I_3$ and an angle $\alpha_3$. As can be seen from FIG. 6, the phasor 600 is a superposition of the phasor 400 and the phasor 500. In other words, the phasor 600 is a vector addition of the phasor 400 caused by the stray light and the correct phasor 500 for the white wall.

Similar to what is described above for the street sign 210, other objects such as wind shields, traffic mirrors or license plates of cars may cause intense stray light and may, hence, be understood as highly reflective objects.

However, stray light is not only caused by highly reflective objects in a scene sensed by a ToF camera. In general, any object reflecting "too much" light may cause the above described stray light artefacts. For example, an object such as a hand or a face located (very) close to the ToF camera may reflect a lot of light back to the ToF camera although it is not highly reflective. That is, any object—irrespective whether it is highly reflective or not—may cause stray light that leads to wrong ToF measurements. For example, if the ToF camera is used for a face recognition or a gesture recognition application (e.g. sensing the hands of a vehicle driver for determining a user input), a sensed face or any other sensed body part of a user may be in close proximity to the ToF camera such that the face or the other body part of the user causes stray light that is captured by the ToF camera.

Referring back to FIG. 1, method 100 may allow to compensate for the stray light caused by an object (e.g. a highly reflective object or an object close to the ToF camera) in a scene that is sensed by a ToF camera. Method 100 comprises controlling 104 the ToF camera to capture a reference image of the scene using a code modulated signal for illumination (instead of the continuous wave signal used for capturing the image of the scene) such that a measurement range of the ToF camera is limited to a distance range around the object causing the stray light.

Coded modulation is used to fix the measurement range of the ToF camera to the region around the object to characterize the object. For coded modulation, a code modulated signal is used for illumination instead of a continuous wave modulated signal. In a code modulated signal, the sequence of pulses is altered. In other words, while a continuous wave modulated signal exhibits an alternating series of high and low pulses of equal length (duration), a code modulated signal exhibits pulses of varying length. For example, Kasami code sequences or m-sequences may be used for a code modulated signal.

A consequence of the code modulated signal for illumination is that the correlation function is only different from a constant value for reflected light originating from a certain distance range with respect to the ToF camera. In other words, only light reflected from an object within a certain distance range causes a value of the correlation function that is different from the constant value. In terms of a mathematical expression, this may be expressed as follows:

$$c(d) = \begin{cases} f(d) & \text{if } d_{min} \leq d \leq d_{max} \\ a & \text{if } d < d_{min} \text{ or } d > d_{max} \end{cases}, \quad (3)$$

with c(d) denoting the correlation function, d denoting the distance to the ToF camera of the object reflecting the light, a denoting a constant value, f(d) denoting a distance dependent function, $d_{min}$ denoting a minimum distance of the object reflecting the light to the ToF camera for which the correlation function is sensitive to reflected light and $d_{max}$ denoting a maximum distance of the object reflecting the light to the ToF camera for which the correlation function is sensitive to reflected light.

In other words, a correlation range of the correlation function is limited for a code modulated signal compared to a continuous wave modulated signal. The correlation range for which the correlation function is sensitive for reflected light from an object sensed by the ToF camera defines the measurement range of the ToF camera. That is, the measurement range of the ToF camera corresponds to the correlation range of the correlation function for which the correlation function outputs distance dependent output values.

By capturing the scene using a code modulated signal for illumination such that the measurement range of the ToF camera is limited to a distance range around the object causing the stray light, the stray light emitted the object in the scene may be characterized. For example, the reference image of the scene generated using the code modulated signal for illumination may allow to derive the undesired phasor 400 caused by the stray light of the street sign 210.

Pixels of the reference image indicate (represent) reference values substantially exclusively related to light reflections (stray light) from the object. In other words, the pixels of the reference image indicate values that are caused (substantially) only by the light reflections (stray light) from the object but not from light reflections of any other object such as an object in the surrounding environment of the object. The reference image may, e.g., be a reference raw image or an image derived therefrom. For example, pixels of a reference phasor image merely indicate phasors related to/caused by light reflections (stray light) from the object such as the exemplary phasor 400 illustrated in FIG. 4. Accordingly, the reference image allows to compensate for the effect of the stray light from the object in the image of the scene.

When modifying 106 the image of the scene or the image derived therefrom, the values indicated by the pixels of the image of the scene or the image derived therefrom are modified by the reference values indicated by the pixels of the reference images. For example, the image of the scene or the image derived therefrom may be modified pixelwise using the reference image. In other words, a value indicated by a pixel of the image of the scene or the image derived therefrom is modified by a reference value indicated by a pixel located at the same or a corresponding pixel position in the reference image. For example, a reference value indicated by a pixel of the reference image may be subtracted from a value indicated by a pixel of the image of the scene or the image derived therefrom. For example, the reference values may indicate a phase shift between the code modulated signal used for illumination and measurement signals generated by the ToF camera based on the reflected light from the scene. The reference values may, e.g., indicate phasors. In other words, an erroneous phase caused by the stray light of the object may be corrected by subtracting the stray light phasor from the measured phasor. This may be done by subtracting the phase values of the coded modulation image (e.g. raw pixel output values) from the values of the initial continuous wave image. The result is the corrected target object, which is not influence by the strong reflections of the object. However, the proposed concept is not limited to subtracting reference values from values indicated by the pixels of the image of the scene or the image derived therefrom. In general, the pixels of the image of the scene or the image derived therefrom may be modified/adjusted/varied in any suitable way based on the pixels of the reference image.

Method 100 comprises additionally outputting 108 the compensated image of the scene. Similar to what is described above for the received image of the scene, the compensated image of the scene may, e.g., be a raw image or an image derived from the raw image such as, e.g., a phase-angle image (comprising pixels that represent phase shifts/phase angles derived from one or more correlation values for the respective pixel of the light capturing element), an image derived from the phase-angle image, a phasor image, an image derived from the phasor image an intensity image, an image derived from the intensity image, a depth image or an image derived from the depth image.

The compensated image of the scene is corrected for the effects of the light reflections stray light) from the object. Hence, erroneous measurements by the ToF camera as represented by the pixels of the image of the scene may be at least mitigated in the compensated image of the scene. In some examples, the compensated image of the scene may be free from effects of the light reflections (stray light) from the object.

In some examples, method 100 further comprises determining that the object causes (intense, too much) stray light based on the image of the scene. As described above, for capturing the image of the scene, the ToF camera uses a continuous wave modulated signal for illuminating the scene and generates measurement signals based on reflected light from the scene. The image of the scene is based on correlations of the continuous wave modulated signal and the measurement signals according to a correlation function. Determining that the object causes stray light may, e.g., comprise determining a distance of the object to the ToF camera based on the image of the scene. Further, determining that the object causes stray light may comprise comparing a correlation value of at least one of the correlations to a threshold value. The correlation value represents the intensity of the light received from the object and is depth/distance dependent. Accordingly, the threshold value depends on the determined distance of the object to the ToF camera. If the correlation value is above the threshold value, it is determined that the object causes (intense, too much) stray light. For example, a conventional four phase ToF depth image of the scene may be captured, and a highly reflective surface in the scene may be detected by its signal strength (i.e. the amplitude of the related autocorrelation function).

Further, method 100 may comprise adjusting the modulation code such that the code modulated signal correlates like a continuous wave function in the range of the reflective surface. Therefore, method 100 may comprise determining the distance of the object to the ToF camera based on the image of the scene. Further, method 100 may comprise adjusting the code modulated signal based on the determined distance of the object to the ToF camera.

Adjusting the code modulated signal may, e.g., comprise selecting one of a plurality of predefined code modulated signals based on the distance of the object to the ToF camera. For example, each of the plurality of predefined code modulated signals may be designed to cover a specific correlation range of the correlation function, i.e. a specific measurement range of the ToF camera. By selecting one of the predefined code modulated signals, the measurement range of the ToF camera may be restricted to (substantially) the object such that the influence of the object's stray light may be characterized by means of the captured reference image. In alternative examples, a modulation code for the code modulated signal, i.e. the code modulated signal, may be created (generated) on the fly based on the determined distance of the object to the ToF camera. The restricted measurement range may, e.g., be a foreground, a range that is not relevant for an application using the image of the scene, or be the determined distance to the object plus/minus a predefined range (e.g. a few centimeters or a few ten centimeters).

Figure 7:
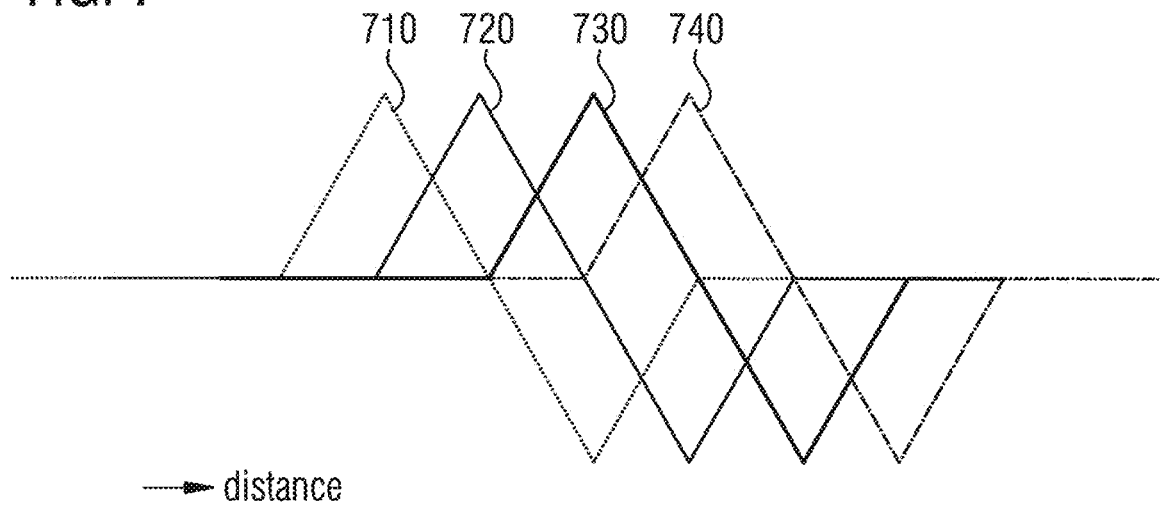
FIG. 7 illustrates an example of auto correlation functions for code modulated illumination signals.
Figure 8:
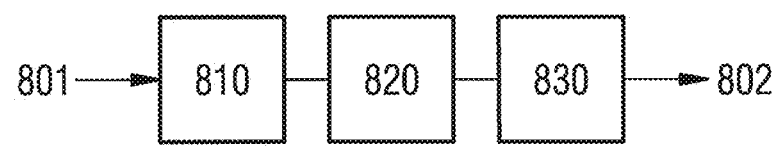
FIG. 8 illustrates an example of an apparatus for compensating stray light caused by an object in a scene that is sensed by a ToF camera.

For example, four different reference images may be captures using a phase shifted modulation code. This is exemplary illustrated in FIG. 7 depicting the related (associated) correlation functions 710, 720, 730 and 740. The correlation functions 710, 720, 730 and 740 have values different from a constant value only for light reflected from an object within a respective distance range (i.e. a first distance range for the first code modulated signal, a second distance range for the second code modulated signal, etc.). The phase shift of the modulation code among the four reference images allows to mimic the continuous wave autocorrelation function in the range of the surface (object) causing the stray light.

In some examples, a four phase ToF depth image may be taken as image of the scene and four raw images using phase shifted code modulated signals may be taken to compensate for the stray light of the object. In other examples, the coded modulation measurement may be reduced to two images (e.g. with a 0° and a 90° phase offset). Phase values for a 180° and a 270° phase offset may be calculated by subtracting the sum of the phase values from the continuous wave measurements (for capturing the image of the scene) from the coded modulation images for the 0° and 90° phase offset since the sum of the phase values from the continuous wave measurements in a pixel defines the origin. In other words, the image of the scene may be a raw image of a first series of raw images captured by the ToF camera or be derived from the first series of raw image. Further, the reference image may be a raw image of a second series of raw images captured by the ToF camera or be derived from the second series of raw image. The first series of raw images comprises more raw images than the second series of raw images.

In some examples, adjusting the code modulated signal may further be based on information about a movement of the ToF camera after capturing the image of the scene. This may allow to compensate for a position and/or orientation change of the ToF camera between capturing the image of the scene and capturing the reference image of the scene. The information about the movement of the ToF camera may, e.g., indicate a movement speed of an element comprising/holding the ToF camera, a steering (direction change) of an element comprising/holding the ToF camera, etc. For example, the information about the movement of the ToF camera may be provided by a Global Navigational Satellite System (GLASS) such as the Global Positioning System (GPS), Galileo, Beidou or GLONASS, or an Inertial Measurement Unit (IMU).

Modifying the image of the scene or an image derived therefrom using the reference image may further comprises scaling the reference values indicated by the pixels of the reference image by a scaling function to obtain a scaled reference image. Further, modifying the image of the scene or an image derived therefrom may comprise modifying the image of the scene or the image derived therefrom using the scaled reference image to obtain the compensated image. Scaling the reference values indicated by the pixels of the reference image may be used to compensate for differences between the continuous wave measurements and the coded modulation measurements. For example, different exposure times may be used for the continuous wave measurements and the coded modulation measurements. Further, the power of the received light from the scene is higher for the continuous wave measurements than for the coded modulation measurements. By scaling the reference values indicated by the pixels of the reference image, effects such as the above exemplary effects may be compensated. The scaling function may, e.g., be a constant function (i.e. be a scaling factor), a variable function depending on one or more parameters, a mapping function, or a look-up table.

A first result of method 100 is the corrected target object, which is not influenced by strong reflections of the object. A second result of method 100 is the depth and the influence of the strong reflector, which is not influenced by the background. This may allow to create a confidence image comprising both depth values (for the object and the surrounding area of the object) with their respective signal (correlation) strengths for each pixel. In other words, at least one pixel of the compensated image may indicate a distance to the ToF camera based on the modification of the image of the scene or the image derived therefrom using the reference image and may additionally indicate a distance of the stray light causing object to the ToF camera.

In some examples, images of the scene at different illumination frequencies (e.g. 60 MHz and 80 MHz) may be captured and combined to enable long distance ToF measurements. The same code modulated signal may be used to correct both images of the scene. Accordingly, method 100 may further comprise receiving another image of the scene from the ToF camera. The other image of the scene is captured by the ToF camera using a continuous wave modulated signal for illuminating the scene that exhibits a different frequency than the continuous wave modulated signal used for capturing the (initial) image of the scene (e.g. two images taken at 60 MHz and 80 MHz modulation frequency). Further, method 100 may comprise modifying the other image of the scene or an image derived therefrom using the reference image to obtain another compensated image of the scene (e.g. as described above for the image of the scene). A depth image of the scene may be obtained by combining the compensated image of the scene and the other compensated image of the scene.

An example of an apparatus 800 for compensating stray light caused by an object in a scene according to the proposed concept is further illustrated in FIG. 4. The apparatus 800 comprises a processing circuit 820. For example, the processing circuit 820 may be a single dedicated processor, a single shared processor, or a plurality of individual processors, some of which or all of which may be shared, a digital signal processor (DSP) hardware, an application specific integrated circuit (ASIC) or a field programmable gate array (FPGA). The processing circuit 820 may optionally be coupled to, e.g., read only memory (ROM) for storing software, random access memory (RAM) and/or non-volatile memory. The apparatus 800 may further comprise other hardware—conventional and/or custom.

The apparatus 800 comprises an input circuit 810 configured to receive input data 801 representing the image of the scene and the reference image of the scene. The processing circuit 820 processes the input data 801 according to the above described concept for compensating the stray light caused by an object in the scene. Accordingly, an output circuit 830 of the apparatus outputs output data 802 representing the compensated image of the scene.

For example, the functionalities of apparatus 800 may be implemented in an application processor coupled to a ToF camera module providing the image or to the ToF camera module itself.

The examples as described herein may be summarized as follows:

Some examples relate to a method for compensating stray light caused by an object in a scene that is sensed by a ToF camera. The method comprises receiving an image of the scene from the ToF camera. Further, the method comprises controlling the ToF camera to capture a reference image of the scene using a code modulated signal for illumination such that a measurement range of the ToF camera is limited to a distance range around the object. The method additionally comprises modifying the image of the scene or an image derived therefrom using the reference image to obtain a compensated image of the scene. The method comprises outputting the compensated image.

According to some examples, the image of the scene is one of a raw image or an image derived from the raw image.

In some examples, the method further comprises determining that the object causes stray light based on the image of the scene.

According to some examples, for capturing the image of the scene, the ToF camera uses a continuous wave modulated signal for illuminating the scene and generates measurement signals based on reflected light from the scene. The image of the scene is based on correlations of the continuous wave modulated signal and the measurement signals according to a correlation function. Determining that the object causes stray light comprises: determining a distance of the object to the ToF camera based on the image of the scene; comparing a correlation value of at least one of the correlations to a threshold value, wherein the threshold value depends on the determined distance of the object to the ToF camera; and determining that the object causes stray light if the correlation value is above the threshold value.

In some examples, the method further comprises determining a distance of the object to the ToF camera based on the image of the scene; and adjusting the code modulated signal based on the determined distance of the object to the ToF camera.

Adjusting the code modulated signal comprises, according to some examples, selecting one of a plurality of predefined code modulated signals based on the distance of the object to the ToF camera.

In some examples, adjusting the code modulated signal is further based on information about a movement of the ToF camera after capturing the image of the scene.

According to some examples, modifying the image of the scene or the image derived therefrom using the reference image comprises subtracting reference values indicated by the pixels of the reference image from values indicated by the pixels of the image of the scene or the image derived therefrom.

In some examples, the reference values indicate a phase shift between the code modulated signal and measurement signals generated by the ToF camera based on reflected light from the scene.

According to some examples, the reference values indicate phasors.

In some examples, modifying the image of the scene or an image derived therefrom using the reference image comprises: scaling reference values indicated by the pixels of the reference image by a scaling function to obtain a scaled reference image; and modifying the image of the scene or the image derived therefrom using the scaled reference image to obtain the compensated image.

According to some examples, the image of the scene is a raw image of a first series of raw images captured by the ToF camera or is derived from the first series of raw image. The reference image is a raw image of a second series of raw images captured by the ToF camera or is derived from the second series of raw image. The first series of raw images comprises more raw images than the second series of raw images.

In some examples, at least one pixel of the compensated image indicates a distance to the ToF camera based on the modification of the image of the scene or the image derived therefrom using the reference image and additionally indicates a distance of the object to the ToF camera.

According to some examples, the method further comprises: receiving another image of the scene from the ToF camera, wherein the other image of the scene is captured by the ToF camera using a continuous wave modulated signal for illuminating the scene that exhibits a different frequency than a continuous wave modulated signal used for capturing the image of the scene; modifying the other image of the scene or an image derived therefrom using the reference image to obtain another compensated image of the scene; and combining the compensated image of the scene and the other compensated image of the scene to obtain a depth image of the scene.

Other examples relate to an apparatus for compensating stray light caused by an object in a scene that is sensed by a ToF camera. The apparatus comprises an input circuit configured to receive an image of the scene from the ToF camera. Further, the apparatus comprises a processing circuit configured to control the ToF camera to capture a reference image of the scene using a code modulated signal for illumination such that a measurement range of the ToF camera is limited to a range around the object. The processing circuit is additionally configured to modify the image of the scene or an image derived therefrom using the reference image to obtain a compensated image of the scene. The apparatus comprises an output circuit configured to output the compensated image.

Further examples relate to another apparatus for compensating stray light caused by an object in a scene that is sensed by a ToF camera. The apparatus comprises means for receiving an image of the scene from the ToF camera. Further, the apparatus comprises means for controlling the ToF camera to capture a reference image of the scene using a code modulated signal for illumination such that a measurement range of the ToF camera is limited to a range around the object. Additionally, the apparatus comprises means for modifying the image of the scene or an image derived therefrom using the reference image to obtain a compensated image of the scene. The apparatus comprises means for outputting the compensated image.

Examples relate to a non-transitory machine readable medium having stored thereon a program having a program code for performing the method for compensating stray light caused by an object in a scene that is sensed by a ToF camera as described herein, when the program is executed on a processor or a programmable hardware.

Other examples relate to a program having a program code for performing the method for compensating stray light caused by an object in a scene that is sensed by a ToF camera as described herein, when the program is executed on a processor or a programmable hardware.

Examples according to the proposed concept may allow surface error correction with continuous wave and coded modulation measurements for ToF cameras.

The description and drawings merely illustrate the principles of the disclosure. Furthermore, all examples recited herein are principally intended expressly to be only for illustrative purposes to aid the reader in understanding the principles of the disclosure and the concepts contributed by the inventor(s) to furthering the art. All statements herein reciting principles, aspects, and examples of the disclosure, as well as specific examples thereof, are intended to encompass equivalents thereof.

A block diagram may, for instance, illustrate a high-level circuit diagram implementing the principles of the disclosure. Similarly, a flow chart, a flow diagram, a state transition diagram, a pseudo code, and the like may represent various processes, operations or steps, which may, for instance, be substantially represented in computer readable medium and so executed by a computer or processor, whether or not such computer or processor is explicitly shown. Methods disclosed in the specification or in the claims may be implemented by a device having means for performing each of the respective acts of these methods.

It is to be understood that the disclosure of multiple acts, processes, operations, steps or functions disclosed in the specification or claims may not be construed as to be within the specific order, unless explicitly or implicitly stated otherwise, for instance for technical reasons. Therefore, the disclosure of multiple acts or functions will not limit these to a particular order unless such acts or functions are not interchangeable for technical reasons. Furthermore, in some examples a single act, function, process, operation or step may include or may be broken into multiple sub-acts, -functions, -processes, -operations or -steps, respectively. Such sub acts may be included and part of the disclosure of this single act unless explicitly excluded.

Furthermore, the following claims are hereby incorporated into the detailed description, where each claim may stand on its own as a separate example. While each claim may stand on its own as a separate example, it is to be noted that—although a dependent claim may refer in the claims to a specific combination with one or more other claims—other examples may also include a combination of the dependent claim with the subject matter of each other dependent or independent claim. Such combinations are explicitly proposed herein unless it is stated that a specific combination is not intended. Furthermore, it is intended to include also features of a claim to any other independent claim even if this claim is not directly made dependent to the independent claim.

What is claimed is:

1. A method for compensating stray light caused by an object in a scene that is sensed by a time-of-flight camera, the method comprising:

receiving an image of the scene from the time-of-flight camera;

controlling the time-of-flight camera to capture a reference image of the scene using a code modulated signal for illumination such that a measurement range of the time-of-flight camera is limited to a distance range around the object;

modifying the image of the scene or an image derived therefrom using the reference image to obtain a compensated image of the scene; and outputting the compensated image.

2. The method of claim 1, wherein the image of the scene is one of a raw image or an image derived from the raw image.

3. The method of claim 1, further comprising determining that the object causes stray light based on the image of the scene.

4. The method of claim 3, wherein, for capturing the image of the scene, the time-of-flight camera uses a continuous wave modulated signal for illuminating the scene and generates measurement signals based on reflected light from the scene, wherein the image of the scene is based on correlations of the continuous wave modulated signal and the measurement signals according to a correlation function, and wherein determining that the object causes stray light comprises:

determining a distance of the object to the time-of-flight camera based on the image of the scene;

comparing a correlation value of at least one of the correlations to a threshold value, the threshold value depending on the determined distance of the object to the time-of-flight camera; and determining that the object causes stray light if the correlation value is above the threshold value.

5. The method of claim 1, further comprising:

determining a distance of the object to the time-of-flight camera based on the image of the scene; and adjusting the code modulated signal based on the determined distance of the object to the time-of-flight camera.

6. The method of claim 5, wherein adjusting the code modulated signal comprises selecting one of a plurality of predefined code modulated signals based on the distance of the object to the time-of-flight camera.

7. The method of claim 5, wherein adjusting the code modulated signal is further based on information about a movement of the time-of-flight camera after capturing the image of the scene.

8. The method of claim 1, wherein modifying the image of the scene or the image derived therefrom using the reference image comprises:

subtracting reference values indicated by the pixels of the reference image from values indicated by the pixels of the image of the scene or the image derived therefrom.

9. The method of claim 8, wherein the reference values indicate a phase shift between the code modulated signal and measurement signals generated by the time-of-flight camera based on reflected light from the scene.

10. The method of claim 8, wherein the reference values indicate phasors.

11. The method of claim 1, wherein modifying the image of the scene or an image derived therefrom using the reference image comprises:

scaling reference values indicated by the pixels of the reference image by a scaling function to obtain a scaled reference image; and modifying the image of the scene or the image derived therefrom using the scaled reference image to obtain the compensated image.

12. The method of claim 1, wherein the image of the scene is a raw image of a first series of raw images captured by the time-of-flight camera or is derived from the first series of raw image, wherein the reference image is a raw image of a second series of raw images captured by the time-of-flight camera or is derived from the second series of raw image, and wherein the first series of raw images comprises more raw images than the second series of raw images.

13. The method of claim 1, wherein at least one pixel of the compensated image indicates a distance to the time-of-flight camera based on the modification of the image of the scene or the image derived therefrom using the reference image and additionally indicates a distance of the object to the time-of-flight camera.

14. The method of claim 1, further comprising:

receiving another image of the scene from the time-of-flight camera, wherein the other image of the scene is captured by the time-of-flight camera using a continuous wave modulated signal for illuminating the scene that exhibits a different frequency than a continuous wave modulated signal used for capturing the image of the scene;

modifying the other image of the scene or an image derived therefrom using the reference image to obtain another compensated image of the scene; and combining the compensated image of the scene and the other compensated image of the scene to obtain a depth image of the scene.

15. An apparatus for compensating stray light caused by an object in a scene that is sensed by a time-of-flight camera, the apparatus comprising:

an input circuit configured to receive an image of the scene from the time-of-flight camera;

a processing circuit configured to:

control the time-of-flight camera to capture a reference image of the scene using a code modulated signal for illumination such that a measurement range of the time-of-flight camera is limited to a range around the object; and modify the image of the scene or an image derived therefrom using the reference image to obtain a compensated image of the scene; and an output circuit configured to output the compensated image.

16. The apparatus of claim 15, wherein the processing circuit is further configured to determine that the object causes stray light based on the image of the scene.

17. The apparatus of claim 16, wherein the processing circuit is further configured to generate measurement signals based on reflected light from the scene, wherein the image of the scene is based on correlations of the continuous wave modulated signal and the measurement signals according to a correlation function, and wherein the processing circuit is further configured to determine a distance of the object to the time-of-flight camera based on the image of the scene, compare a correlation value of at least one of the correlations to a threshold value, the threshold value depending on the determined distance of the object to the time-of-flight camera, and determine that the object causes stray light if the correlation value is above the threshold value.

18. The apparatus of claim 15, wherein the processing circuit is further configured to determine a distance of the object to the time-of-flight camera based on the image of the scene and adjust the code modulated signal based on the determined distance of the object to the time-of-flight camera.

19. The apparatus of claim 18, wherein the processing circuit is configured to adjust the code modulated signal by selecting one of a plurality of predefined code modulated signals based on the distance of the object to the time-of-flight camera.

20. The apparatus of claim 15, wherein the processing circuit is further configured to subtract reference values indicated by the pixels of the reference image from values indicated by the pixels of the image of the scene or the image derived therefrom, to modify the image of the scene or the image derived therefrom using the reference image comprises.

* * * * *